United States Patent
Mardon et al.

[11] Patent Number: 5,940,464
[45] Date of Patent: Aug. 17, 1999

[54] TUBE FOR A NUCLEAR FUEL ASSEMBLY, AND METHOD FOR MAKING SAME

[75] Inventors: Jean-Paul Mardon, Caluire; Jean Senevat, Saint Brevin Les Pins; Daniel Charquet, Ugine Cedex, all of France

[73] Assignees: Framatome, Courbevoie; Compagnie Generale des Matiéres Nucléaires, Velizy-Villacoblay, both of France

[21] Appl. No.: 09/000,104
[22] PCT Filed: Jul. 22, 1996
[86] PCT No.: PCT/FR96/01149
  § 371 Date: Apr. 20, 1998
  § 102(e) Date: Apr. 20, 1998
[87] PCT Pub. No.: WO97/05628
  PCT Pub. Date: Feb. 13, 1997

[30] Foreign Application Priority Data

Jul. 27, 1995 [FR] France ................................ 95 09166

[51] Int. Cl.$^6$ ......................................................... G21C 3/07
[52] U.S. Cl. ........................... 376/457; 420/422; 148/672
[58] Field of Search ........................... 376/414, 416–418, 376/457, 260, 261; 148/672; 420/422

[56] References Cited

U.S. PATENT DOCUMENTS 5,023,048 6/1991 Mardon et al. ........................... 376/416
5,254,308 10/1993 Garde et al. ............................. 420/422

FOREIGN PATENT DOCUMENTS 0533073 9/1992 European Pat. Off. .
94/23081 10/1994 WIPO .

OTHER PUBLICATIONS

Patent Abstracts of Japan—vol. 016, No. 393 (P–1406), Aug. 20, '92 & JP,A,04 128687 (Nuclear Fuel Ind. Ltd.), Apr. 30, '92.

*Primary Examiner*—Daniel D. Wasil
*Attorney, Agent, or Firm*—Law Offices Pollock, Vande Sande & Amernick

[57] ABSTRACT

A zirconium alloy tube for forming the whole or the outer portion of a nuclear fuel pencil housing or a nuclear fuel assembly guide tube. The zirconium alloy contains 0.8–1.8 wt. % of niobium, 0.2–0.6 wt. % of tin and 0.02–0.4 wt. % of iron, and has a carbon content of 30–180 ppm, a silicon content of 10–120 ppm and an oxygen content of 600–1800 ppm. The tube may be used when recrystallized or stress relieved.

8 Claims, 3 Drawing Sheets

TUBE FOR A NUCLEAR FUEL ASSEMBLY, AND METHOD FOR MAKING SAME

The present invention relates to tubes of zirconium-base alloy suitable for use, in particular, for constituting all or the outer portion of the cladding of a nuclear fuel rod, and also to a method of manufacturing them.

Until now, use has been made above all of cladding made of a so-called "Zircaloy 4" alloy which contains tin, iron, and chromium in addition to zirconium. Numerous other compositions have been proposed, with content ranges that are often so broad that, to the person skilled in the art, they can be seen immediately to be purely speculative.

In particular, various alloys have been proposed with a niobium content lying in a range so broad that their resistance to thermal creep is quite poor at maximum values, whatever the metallurgical treatments used in making the alloy.

Alloys have also been proposed that contain, in addition to zirconium, tin to improve creep resistance, and iron.

An object of the invention is to provide tubes that have simultaneously good creep behavior and good resistance to corrosion, even in a high temperature medium containing lithium, while nevertheless being capable of being manufactured with a low reject rate, and being suitable for use in making cladding or guide tubes for fuel assemblies.

One of the causes of rejects is the formation of cracks during mechanical and heat treatments, giving rise to defects that make the tubes unacceptable. This risk exists particularly for high tin contents.

To achieve the above objects, there is provided a tube of zirconium-base alloy containing, by weight, 0.8% to 1.8% niobium, 0.2% to 0.6% tin, and 0.02% to 0.4% iron, the alloy being in the recrystallized state or in relaxed state, depending on whether it is desired to enhance resistance to corrosion or to creep.

The alloy has a carbon content lying in the range 30 parts per million (ppm) to 180 ppm, a silicon content lying in the range 10 ppm to 120 ppm, and an oxygen content lying in the range 600 ppm to 1600 ppm.

The relatively high niobium content, which is always above the solubility limit (about 0.6%), provides high resistance to corrosion in an aqueous medium at high temperature. If used alone, niobium at such concentrations imparts creep characteristics to the alloy which are of interest but insufficient. Tin, when associated with niobium, improves creep resistance and also resistance to an aqueous medium containing lithium, without running the risk of causing cracks to be formed during rolling if its content does not exceed 0.6%. An iron content of up to 0.4% participates in compensating for the unfavorable effect of tin on generalized corrosion.

The contents given above take account of the way in which tolerances and variations within a single ingot mean that the limits can be reached even for set specific contents lying within a narrower range. For example, set contents of 0.84% and 1.71% Nb may give rise within a single ingot to local contents of 0.8% and of 1.8% depending on proximity to the leading end or the trailing end of the ingot.

In addition to the above-specified elements, the alloy contains inevitable impurities, but always at very low contents.

It has been found that set content values of niobium in the range 0.9% to 1.1%, of tin in the range 0.25% to 0.35%, and of iron in the range 0.2% to 0.3% give results that are particularly favorable.

Because of the relatively low tin content, recrystallization during metal-making can be performed at a relatively low temperature, below 620° C., and that has a favorable effect on hot corrosion resistance and on creep.

The invention also provides a method of manufacturing a tube for constituting cladding for a nuclear fuel rod or a guide tube for a nuclear fuel assembly. The initial alloy-making stage can be that performed conventionally for so-called "Zircaloy 4" alloys. However, the final stages are different, and in particular they make use of recrystallization heat treatments at relatively low temperature only.

In particular, the method may comprise the following steps:

making a bar of zirconium-base alloy having the above-specified composition;

quenching the bar in water, after being heated to a temperature in the range 1000° C. to 1200° C.;

drawing the bar into a tubular blank after heating to a temperature lying in the range 600° C. to 800° C.;

annealing the drawn blank at a temperature in the range 590° C. to 650° C.; and cold-rolling said blank in at least four passes in order to obtain a tube, with intermediate heat treatments at temperatures in the range 560° C. to 620° C.

The recrystallization ratio is advantageously increased from one step to the next in order to render grain size finer.

In general, the final heat treatment is performed in the range 560° C. to 620° C. when the alloy is to be in recrystallized state, and in the range 470° C. to 500° C. when the tube is to be used in relaxed state.

The alloy obtained in this way has resistance to generalized corrosion in an aqueous medium at high temperature, representative of conditions within a pressurized water reactor, that is comparable to that of known Zr—Nb alloys having high niobium content, and it has thermal creep resistance that is much greater than that of such alloys and that is comparable to that of the best "Zircaloy 4" alloys.

By way of example, an alloy comprising 0.9% to 1.1% niobium, 0.25% to 0.35% tin, and 0.03% to 0.06% iron has been made. The metallurgical treatment sequence used comprised rolling over four cycles, with two-hour periods of heat treatment at 580° C. interposed between the rolling step. The work hardening ratios and the recrystallization ratios were as follows:

|  | Work hardening ratio (%) | Recrystallization ratio (%) |
|---|---|---|
| First pass | 40 | 70 |
| Passes (2 or 3) | 50 to 60 | 80 |
| Last pass | 30 | 100 |

Additional tests have been carried out for determining the influence of the iron and tin content on alloys having 1% of niobium, with contents C, $S_i$ and O2 in the above indicated ranges formed into sheets and processed up to $\Sigma a = 5.23 \times 10^{-18}$, with a final recrystallization step at 580° C. The corrosion tests were carried out:

at 500° C., 415° C. and 400° C. in water steam at 360° C., in water containing 70 ppm of lithium.

The tests results are represented on the attached drawings, wherein :

FIGS. 1 and 2 give the weight increase of alloys according to the invention after 140 days in lithium containing water at 360° C., for different contents of Sn and Fe;

FIG. 3 represents weight increase (which represents uniform corrosion), after 132 days at 400° C. in water steam;

FIG. 4, similar to FIG. 3, corresponds to an exposition of 155 days at 415° C.;

FIG. 5, again similar to FIG. 3, corresponds to an exposition of 24 hours to steam at 500° C. and gives a representation of nodular corrosion; and FIG. 6 is a graph indicating limits of zones in which the resistance to corrosion in different conditions is particularly favorable, making it clear that there is a particular interest in ranges 0.2–0.3% Sn and 0.15–0.3 Fe as regards resistance to corrosion.

FIGS. 1 and 2 indicate that there is no significant enhancement of the resistance to corrosion in lithium containing water beyond about 0.6% Sn and 0.2% Fe.

FIGS. 3 and 4 show there is an interest in an iron content higher than 0.2%, for enhancing the resistance to corrosion in water steam at 400° C. and 415° C. and reducing the undesirable effect of a high Sn content. Such Figures also indicate that the favorable results which are found for an alloy according to the invention are lost if there is a low tin content or no tin.

Last, FIG. 5 indicates that there is a progressive loss of the resistance to nodular corrosion when the tin content increases, without significant improvement of the characteristics by adding iron. FIG. 5 shows that beyond a tin content of 0.6%, corrosion became faster and it also shows that, for an acceptable tin content, corrosion is faster if the iron content increases beyond about 0.3%.

From a general consideration of all results, a composition range which is favorable regarding corrosion is defined by the three curves indicated in FIG. 6. Curve A limits a zone of interest as regards resistance in water at 360° C. with a 70 ppm lithium content i.e. under conditions which are more severe than those which prevail in a reactor, as regards the lithium content. Curve B limits a zone in which there is satisfactory resistance in lithium containing steam at a temperature slightly beyond 400° C. Last, curve C approximately corresponds to a limit of the acceptable contents as regards nodular corrosion resistance, in water steam at 500° C.

It is however possible to exceed the above indicated zone when some types of corrosion are not likely to occur.

We claim:

1. A tube of zirconium-base alloy for constituting all or the outside portion of cladding for a nuclear fuel rod or of a guide tube for a nuclear fuel assembly, made of a zirconium-base alloy containing, by weight, 0.8% to 1.8% niobium, 0.2% to 0.6% tin, and 0.02% to 0.4% iron, plus inevitable impurities, and having a carbon content controlled to lie in the range 30 ppm to 180 ppm, a silicon content in the range 10 ppm to 120 ppm, and an oxygen content in the range 600 ppm to 1800 ppm.

2. A tube according to claim 1, wherein the alloy is in recrystallized state.

3. A tube according to claim 1, wherein the alloy is in relaxed state.

4. A tube according to claim 1, wherein the alloy has set contents: 0.9% to 1.1% niobium, 0.25% to 0.35% tin, and 0.2% to 0.3% iron.

5. A method of manufacturing a tube according to claim 1, including the following steps of:
   making a bar of an alloy containing 0.8% to 1.8% niobium, 0.2% to 0.6% tin, and 0.02% to 0.4% iron;
   after heating in the bar to a temperature in the range 1000° C. to 1200° C., quenching the bar in water;
   drawing the bar into a blank after heating to a temperature in the range 600° C. to 800° C.;
   annealing the drawn blank at a temperature in the range 590° C. to 650° C.; and
   cold rolling the annealed blank in at least four passes into a tube, with intermediate heat treatments at temperatures in the range 560° C. to 620° C.

6. A method according to claim 5, wherein the rolling passes are performed on tubes having increasing recrystallization ratios.

7. A method according to claim 5, further including a recrystallizing final heat treatment step at a temperature in the range 560° C. to 620° C.

8. A method according to claim 5, further including a strain relieving final heat treatment step at a temperature in the range from about 470° C. to 500° C.

* * * * *

(12) EX PARTE REEXAMINATION CERTIFICATE (6718th)
United States Patent
Mardon et al.

(10) Number: US 5,940,464 C1
(45) Certificate Issued: Mar. 24, 2009

(54) TUBE FOR A NUCLEAR FUEL ASSEMBLY, AND METHOD FOR MAKING SAME

(75) Inventors: Jean-Paul Mardon, Caluire (FR); Jean Senevat, Saint Brevin les Pins (FR); Daniel Charquet, Ugine Cedex (FR)

(73) Assignees: Framatome, Courbevoie (FR); Compagnie Generale des Matieres Nucleaires, Velizy-Villacoublay (FR)

Reexamination Request:
No. 90/005,589, Dec. 14, 1999

Reexamination Certificate for:
Patent No.: 5,940,464
Issued: Aug. 17, 1999
Appl. No.: 09/000,104
Filed: Apr. 20, 1998

(22) PCT Filed: Jul. 22, 1996

(86) PCT No.: PCT/FR96/01149

§ 371 (c)(1),
(2), (4) Date: Apr. 20, 1998

(87) PCT Pub. No.: WO97/05628

PCT Pub. Date: Feb. 13, 1997

(30) Foreign Application Priority Data

Jul. 27, 1995 (FR) ............................................. 95 09166

(51) Int. Cl.
*G21C 3/07* (2006.01)

(52) U.S. Cl. ........................ 376/457; 420/422; 148/672
(58) Field of Classification Search .................. 376/414, 376/416–418, 457, 260, 261; 148/672; 420/422
See application file for complete search history.

(56) References Cited

U.S. PATENT DOCUMENTS

| | | | |
|---|---|---|---|
| 4,649,023 A | * | 3/1987 | Sabol et al. ................. 420/422 |
| 4,741,878 A | | 5/1988 | Gebelin et al. |
| 4,765,949 A | | 8/1988 | Denizou et al. |
| 4,773,799 A | | 9/1988 | Guironnet et al. |
| 4,873,117 A | | 10/1989 | Hertz et al. |
| 5,023,048 A | * | 6/1991 | Mardon et al. ............... 376/416 |
| 5,112,573 A | | 5/1992 | Foster et al. ................. 420/422 |
| 5,125,985 A | | 6/1992 | Foster et al. ................. 148/672 |
| 5,180,548 A | | 1/1993 | Verdier |
| 5,230,758 A | | 7/1993 | Foster et al. ................. 148/672 |
| 5,254,308 A | * | 10/1993 | Garde et al. ................. 420/422 |
| 5,266,131 A | | 11/1993 | Foster et al. ................. 148/672 |
| 5,560,790 A | * | 10/1996 | Nikulina et al. ............. 148/672 |
| 5,606,583 A | | 2/1997 | Verdier |
| 5,619,547 A | | 4/1997 | Amiet et al. |
| 5,648,995 A | * | 7/1997 | Mardon et al. ............... 376/261 |
| 5,702,544 A | | 12/1997 | Mardon et al. |
| 5,735,978 A | | 4/1998 | Mardon et al. |
| 5,742,655 A | | 4/1998 | Hertz et al. |
| 5,802,130 A | | 9/1998 | Mardon et al. |
| 5,835,547 A | | 11/1998 | Bour et al. |
| 5,852,642 A | | 12/1998 | Descot et al. |
| 5,852,644 A | | 12/1998 | Brosset et al. |
| 5,887,045 A | | 3/1999 | Mardon et al. |
| 5,889,832 A | | 3/1999 | Bonnamour et al. |
| 5,940,464 A | | 8/1999 | Mardon et al. |
| 6,051,972 A | | 4/2000 | Bour et al. |

FOREIGN PATENT DOCUMENTS

| | | | | |
|---|---|---|---|---|
| JP | 63-145735 | * | 6/1988 | ................. 420/422 |
| JP | 04-128687 | * | 4/1992 | ................. 420/422 |
| WO | 0 533 073 | * | 3/1993 | ................. 420/422 |
| WO | 23081 | * | 10/1994 | ................. 420/422 |

OTHER PUBLICATIONS

Van Swam et al, Zirconium in the Nuclear Industry: Eighth International Symposium, Jun. 1988, ASTM, pp. 227–244.*

(Continued)

*Primary Examiner*—Ricardo J. Palabrica

(57) ABSTRACT

A zirconium alloy tube for forming the whole or the outer portion of a nuclear fuel pencil housing or a nuclear fuel assembly guide tube. The zirconium alloy contains 0.8-1.8 wt. % of niobium, 0.2-0.6 wt. % of tin and 0.02-0.4 wt. % of iron, and has a carbon content of 30-180 ppm, a silicon content of 10-120 ppm and an oxygen content of 600-1800 ppm. The tube may be used when recrystallized or stress relieved.

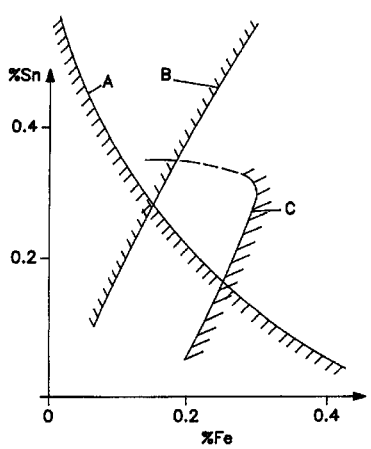

OTHER PUBLICATIONS

Figure 1:
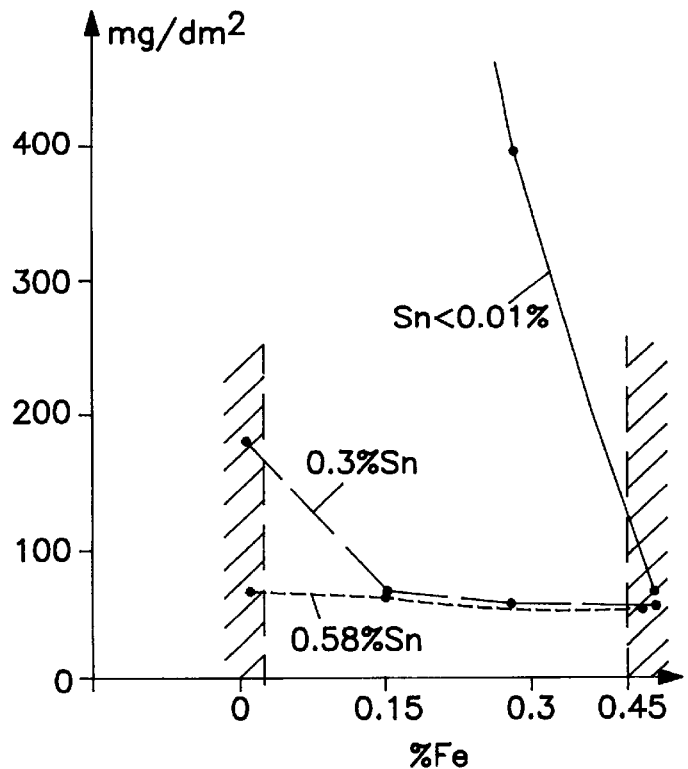
Figure 2:
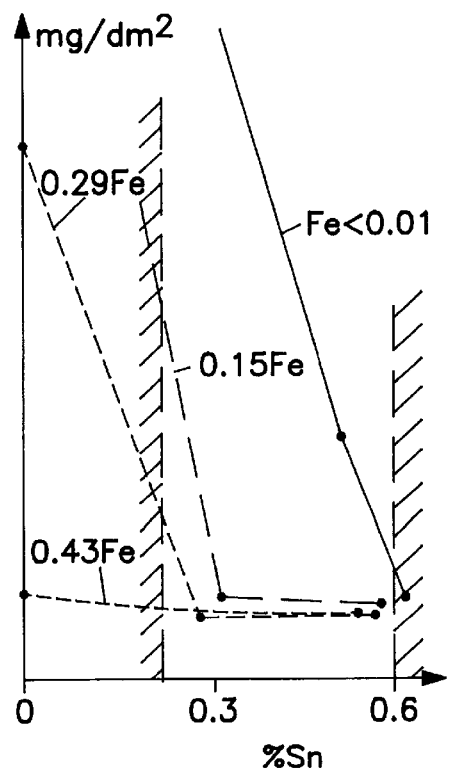
Figure 3:
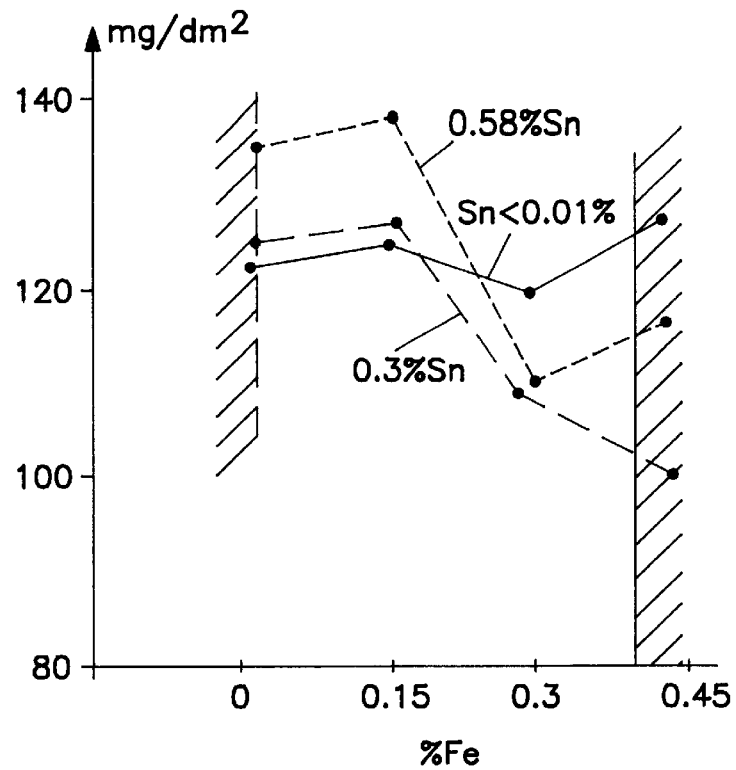
Figure 4:
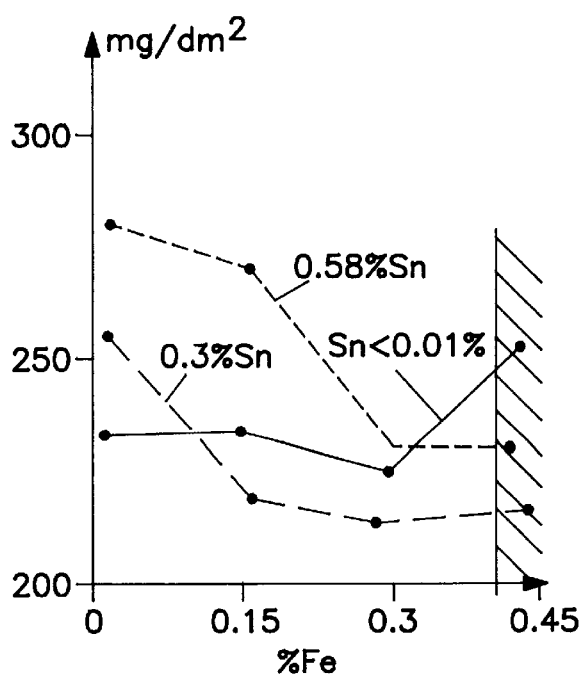
Figure 5:
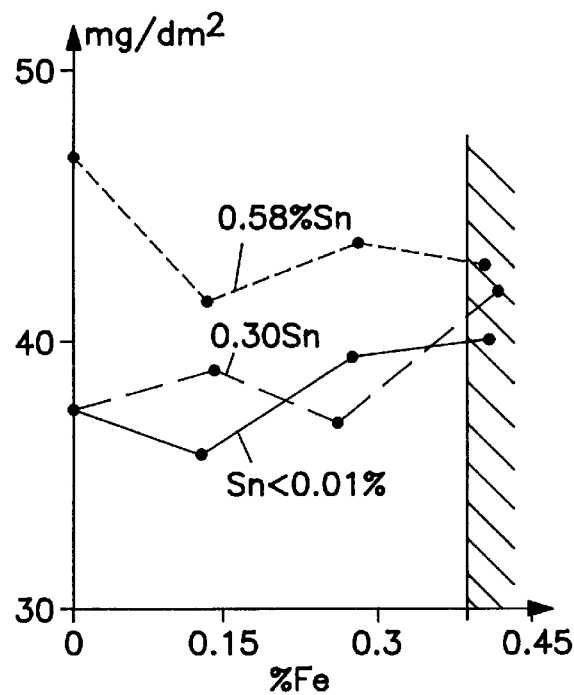
Figure 6:
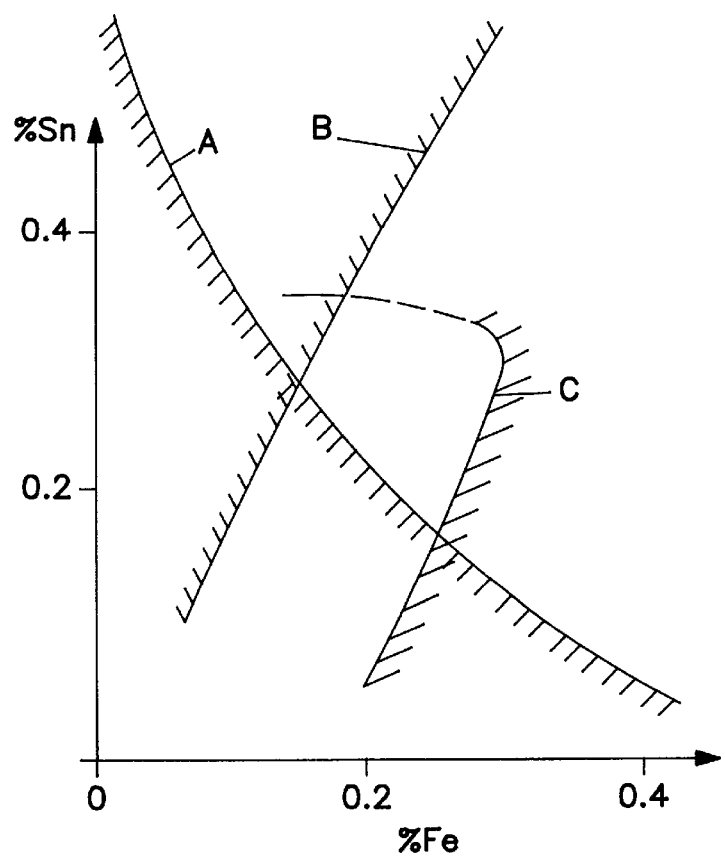

Mardon, J.P., et al., "Development of New Zirconium Alloys For PWR Fuel Rod Cladding", American Nuclear Society Inc., "Proceedings of the 1994 International Topical Meeting on Light Water Reactor Fuel Performance", West Palm Beach Florida, Apr. 17–24, 1994. ASTM Standards B349.

ASTM standards B349.

ASTM standards B350.

ASTM standards B353.

Charquet, D., "Improvement of the Uniform Corrosion Resistance of Zircaloy–4 in the Absence of Irradiation", Journal of Nuclear Materials, pp. 186–195 (1988).

Charquet, D., et al. "Hydrogen Absorption Kinetics During Zircaloy Oxidation in Steam", Anand M. Garde and E. Ross Bradley, "Zirconium in the Nuclear Industry: Tenth International Symposium", STP 1245 ATM, (1994), pp. 80–97.

Kass, S., "The Development of the Zircaloys;" Corrosion of Zirconium Alloys: A Symposium Presented at the 1963 Winter Meeting of the American Nuclear Society, ASTM STP 368, (1964).

Kass, S., "The Development of the Zircaloys," in Proc. Symp. on Zirconium Alloy Development, Castlewood, Pleasanton, California, Nov. 12–14, 1962; Report GEAP–4089, U.S. Atomic Energy Commission.

U.S. Appl. No. 09/011,684, filed Jun. 14, 1997, inventor Hertz et al.

U.S. Appl. No. 09/269,309, filed Sep. 29, 1997, inventor Brosset.

U.S. Appl. No. 09/269,303, filed Sep. 29, 1997, inventor Descot et al.

U.S. Appl. No. 09/242,694, filed Jul. 9, 1998, inventor Mayet et al.

U.S. Appl. No. 09/113,298, filed Jul. 10, 1998, inventor Petit et al.

U.S. Appl. No. 09/903,292, filed Dec. 27, 1999, inventor Thibieroz et al.

U.S. Appl. No. 09/647,339, filed Mar. 30, 1999, inventor Mardon et al.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 5-8 is confirmed.

Claims 1-4 are cancelled.

\* \* \* \* \*